(12) United States Patent
Hamamura

(10) Patent No.: US 7,340,275 B2
(45) Date of Patent: Mar. 4, 2008

(54) WIRELESS COMMUNICATION UNIT

(75) Inventor: Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 638 days.

(21) Appl. No.: 09/982,874

(22) Filed: Oct. 22, 2001

(65) Prior Publication Data
US 2002/0052219 A1    May 2, 2002

(30) Foreign Application Priority Data
Oct. 26, 2000    (JP)    ............... 2000-327546

(51) Int. Cl.
*H04B 1/38* (2006.01)
*H04M 1/00* (2006.01)
*H04M 5/76* (2006.01)

(52) U.S. Cl. .................. 455/557; 455/90.3; 348/231.7; 348/231.9; 348/231.2

(58) Field of Classification Search ................ 455/556, 455/557, 558, 556.1, 556.2, 41.2, 41.3, 90.3; 348/211.2, 231.9, 231.7, 231.99, 231.2
See application file for complete search history.

(56) References Cited

U.S. PATENT DOCUMENTS

| | | | | |
|---|---|---|---|---|
| 5,027,294 | A * | 6/1991 | Fakruddin et al. | 713/300 |
| 5,590,306 | A * | 12/1996 | Watanabe et al. | 711/115 |
| 6,038,434 | A * | 3/2000 | Miyake | 455/186.1 |
| 6,182,004 | B1 * | 1/2001 | Komori | 701/114 |
| 6,256,520 | B1 * | 7/2001 | Suzuki | 455/572 |
| 6,300,976 | B1 * | 10/2001 | Fukuoka | 348/231.99 |
| 6,366,871 | B1 * | 4/2002 | Geva | 702/188 |
| 6,573,927 | B2 * | 6/2003 | Parulski et al. | 348/32 |
| 6,690,417 | B1 * | 2/2004 | Yoshida et al. | 348/231.1 |
| 6,833,861 | B2 | 12/2004 | Matsumoto et al. | |
| 7,062,230 | B1 | 6/2006 | Ishiguro et al. | |
| 2001/0041592 | A1 * | 11/2001 | Suonpera et al. | 455/557 |
| 2002/0013161 | A1 * | 1/2002 | Schaeffer et al. | 455/557 |
| 2002/0109859 | A1 * | 8/2002 | Tipirneni | 358/1.15 |
| 2003/0063196 | A1 * | 4/2003 | Palatov et al. | 348/211.2 |
| 2003/0074179 | A1 | 4/2003 | Ropo et al. | 703/27 |

FOREIGN PATENT DOCUMENTS

EP    1 001 348 A2    5/2000
GB    2 326 062 A    12/1998

* cited by examiner

*Primary Examiner*—George Eng
*Assistant Examiner*—Un C. Cho
(74) *Attorney, Agent, or Firm*—Oliff & Berridge, PLC

(57) ABSTRACT

A wireless communication unit of the present invention comprises: an interface portion signally connected to a connector of a main device, the connector being dedicated to a recording-medium; a recording portion performing non-volatile recording; a wireless communication portion performing wireless communication; and a control portion transmitting information to be recorded through the wireless communication portion to an external destination and generating a backup of the information in the recording portion, the information being inputted from the main device to the control portion through the interface portion. Consequently, obtained is a wireless communication unit capable of being readily fitted even to a main device without a general-purpose card connector provided therein, and also capable of preventing important information from being lost even if the wireless communication fail.

15 Claims, 5 Drawing Sheets

WIRELESS COMMUNICATION UNIT

BACKGROUND OF THE INVENTION

1. Field of the Invention

The present invention relates to a wireless communication unit imparting a function of wireless communication to a main device by being connected thereto.

2. Description of the Related Art

Heretofore, as a wireless communication unit, a PC wireless communication card has been well known. The PC wireless communication card is connected to a general-purpose card connector (for example, PC Card Standard Type 2) of a computer and used.

Meanwhile, a communication driver program for the PC wireless communication card is installed in the computer. The communication driver program controls the PC wireless communication card in response to a communication request such as an AT command generated from an application program and the like, and establishes wireless communication.

Incidentally, mainly in the field of press, there has been an increasing demand that image data imaged by an electronic camera be wirelessly communicated.

In this case, a user moves the image data in the electronic camera to the computer for a while by use of a serial cable or a recording-medium as a medium. Next, the user transmits the image data to a remote place (such as a wireless base station) by use of the PC wireless communication card connected to the computer.

In such wireless communication, normal wireless communication cannot be expected in some cases due to a propagation condition of electric waves or a state a power source of an equipment is in. Therefore, the user has had to sort and store the already transmitted image data for a while without deleting the same immediately. Moreover, the user occasionally has had to delete the already transmitted image data thus accumulated. Since such work is troublesome, it has been difficult to readily perform wireless communication by use of the conventional wireless communication unit.

Furthermore, in the wireless communication as described above, a computer including the general-purpose connector is additionally required. Also from this point of view, it has been difficult to readily perform wireless communication by use of the conventional wireless communication unit.

Note that the above-described issue may be solved to some extent by providing a general-purpose card connector in the electronic camera to directly connect the PC wireless communication card thereto. However, a different problem will arise in which the electronic camera becomes larger by an amount of the general-purpose card connector provided and that the communication driver program or communication software must be installed in the electronic camera.

SUMMARY OF THE INVENTION

It is an object of the present invention to provide a wireless communication unit capable of being attached to a main device such as an electronic camera and also capable of readily performing wireless communication.

It is another object of the present invention to provide a wireless communication unit enabling a user to readily perform wireless communication, without the necessity of sorting and storing transmitted data in preparation for failures in wireless communication.

It is still another object of the present invention to provide a wireless communication unit capable of readily performing wireless communication even with the main device not having a general-purpose card connector provided therein, such as an electronic camera.

Hereinafter, description will be made on the present invention.

(1) A wireless communication unit of the present invention comprises: an interface portion signally connected to a connector of a main device, the connector being dedicated to a recording-medium; a recording portion performing non-volatile recording; a wireless communication portion performing wireless communication; and a control portion transmitting information to be recorded through the wireless communication portion to an external destination and generating a backup of the information in the recording portion, the information being inputted from the main device to the control portion through the interface portion.

The wireless communication unit automatically generates the backup of the information in the wireless communication unit while wirelessly communicating the information. Therefore, even if the wireless communication fail, the information is never lost. Hence, the user does not have to consider sorting and storing the information in preparation for the failure of the wireless communication, thus making it possible to readily perform wireless communication. Furthermore, even with the main device not having a general-purpose card connecter provided therein, the wireless communication unit could be readily connected through the connector dedicated to the recording-medium. For the above reasons, it is made possible to readily perform wireless communication in the present invention.

(2) Another wireless communication unit of the present invention comprises: an interface portion signally connected to a main device; a recording portion performing non-volatile recording; a wireless communication portion performing wireless communication; and a control portion transmitting information through the wireless communication portion to an external destination and generating a backup of the information in the recording portion, the information being inputted from the main device to the control portion through the interface portion.

The wireless communication unit automatically generates the backup of the information in the wireless communication unit while wirelessly communicating the information. Therefore, even if the wireless communication fail, the information is never lost. Hence, the user does not have to consider sorting and storing the information in preparation for the failure of the wireless communication, thus making it possible to readily perform wireless communication.

(3) Another wireless communication unit of the present invention, in the wireless communication unit of the above (2), further comprises: a power source state detection portion judging quality of the state the power source of the wireless communication unit is in. When the quality of the state the power source is in is judged to be good in the power source state detection portion, the control portion transmits the information through the wireless communication portion to the external destination and also generates the backup of the information in the recording portion. Alternatively, when the quality of the state the power source is in is judged not to be good in the power source state detection portion, the control portion does not wirelessly communicate but records the information in the recording portion.

When quality of the state the power source is in is not good, the wireless communication unit does not wirelessly communicate the information but performs non-volatile recording of the information. Hence, wireless communication with the power source in an unstable state may be avoided, and the information can thus be securely saved in the wireless communication unit.

(4) Another wireless communication unit of the present invention, in the wireless communication unit of the above (2), further comprises a mode input portion receiving input of a manipulation by a user of setting an operation mode. The control portion includes, as operation modes set in the mode input portion: a "communication & backup mode" for transmitting and backing up the information; and a "recording mode" for recording the information without transmitting the information.

The wireless communication unit includes, as the operation modes: the "communication & backup mode" and the "recording mode." Selecting the "recording mode" enables the wireless communication unit to be used as the recording-medium. Hence, in an emergent situation where the number of the recording-medium is short, the recording portion of the wireless communication unit can be effectively utilized.

(5) In another wireless communication unit of the present invention, in the wireless communication unit of the above (4), the control portion further includes, as the operation mode set in the mode input portion, a "communication mode" for transmitting the information without performing the non-volatile recording of the information.

The wireless communication unit further includes the "communication mode" as the operation mode. Selecting the "communication mode" enables the function of performing wireless communication in the wireless communication unit to be effectively utilized even in a state where there is not enough backup capacity in the recording portion.

(6) In another wireless communication unit of the present invention, in the wireless communication unit of the above (2), when the control portion generates the backup of the information in the recording portion, the control portion automatically deletes the backup from the recording portion after transmission of the information in the wireless communication portion is normally terminated.

The wireless communication unit automatically deletes the backed-up information from the recording portion after the wireless communication is normally terminated. Hence, there is no longer wasteful consumption of recording capacity in the recording portions because of having remains of backed-up information. Moreover, it is also made possible to save labor for the user to delete the backed-up information later.

(7) A wireless communication unit of the present invention comprises: an interface portion signally connected to a connector of a main device, the connector being dedicated to a recording-medium; a wireless communication portion performing wireless communication; and a control portion having a function of acquiring information to be recorded from the main device while imitating a recording operation done on the main device through the interface portion and a function of transmitting the acquired information through the wireless communication portion to an external destination.

The wireless communication unit performs the wireless communication while imitating the recording operation in a state of being connected to the connector (preferably, a memory card slot) of the main device, the connector being dedicated to the recording-medium. Hence, even with the main device not having a general-purpose card connector provided therein, such as an electronic camera, it is made possible to connect the wireless communication unit instead of the recording-medium. Moreover, in the main device, since the wireless communication is made possible by executing a regular recording operation, any additional preparations of communication driver programs or communication software are not required. Accordingly, there is no need to additionally prepare a computer having general-purpose card connectors, and it is made possible to readily perform wireless communication by using by using main only the main device and the wireless communication unit.

(8) In another wireless communication unit of the present invention, in the wireless communication unit of the above (7), the control portion selects the information with predetermined attribute information and transmits the selected information through the wireless communication portion to the external destination.

When a piece of information has predetermined attribute information, the wireless communication unit wirelessly communicates the piece of information. Hence, it is possible for users to selectively communicate a certain piece of information wirelessly by manipulating the attribute information of the certain piece of information.

(9) In another wireless communication unit of the present invention, in the wireless communication unit of the above (8), the attribute information is attribute information implying write protect.

When a piece of information has attribute information implying the write protect, the wireless communication unit communicates the piece of information wirelessly. Hence, it is possible for users to selectively communicate a certain piece of information wirelessly by manipulating attribute information implying write protect.

(10) In another wireless communication unit of the present invention, in the wireless communication unit of the above (7), while performing wireless communication with the wireless communication portion, the control portion prohibits its power supply from the main device to the wireless communication unit from being stopped by imitating the recording operation done on the main device through the interface.

While wireless communication is performed, the wireless communication unit imitates the recording operation through the interface portion to the main device. Hence, the possibility of the power supply from the main device being stopped during wireless communication is eliminated.

(11) In another wireless communication unit of the present invention, in the wireless communication unit of the above (7), an outer shape of the wireless communication unit has compatibility with an outer shape of the recording-medium connected to the connector of the main device, the connector being dedicated to the recording-medium.

The outer shape of the wireless communication unit has compatibility with the outer shape of the recording-medium. Hence, it is possible to fit the wireless communication unit instead of the recording-medium even to a main device not assuming the use of wireless communication units. Thus, the range in use of the wireless communication unit can be expanded.

(12) Another wireless communication unit of the present invention, in the wireless communication unit of the above (7), is constituted by being divided at least into a connection unit and a body unit, the connection unit including at least the interface portion and having a size and an outer shape allowing the connection unit to be substituted with the recording-medium connected to the connector of the main device, the connector being dedicated to the recording-medium, and the body unit being signally connected to the connection unit and including at least the wireless communication portion.

The wireless communication unit is constituted of a connection unit and a body unit. Hence, it is possible to constitute the connection unit with a small size, and a wireless communication unit capable of being used in substitution of a small-size memory card can thus be readily realized.

(13) In another wireless communication unit of the present invention, in the wireless communication unit of the above (12), the body unit includes an extension connector connectable to the recording-medium. The control portion records the information in the recording-medium connected to the body unit through the extension connector.

The wireless communication unit includes an extension unit for the recording-medium in the body unit. It is possible to increase the recording capacity of the recording portion substantially without limit by appropriately exchanging the recording mediums fitted to the extension unit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, description will be made for embodiments of the present invention with reference to the drawings.

First Embodiment

A first embodiment is an embodiment corresponding to the invention according to claims 1 to 11.

Figure 1:
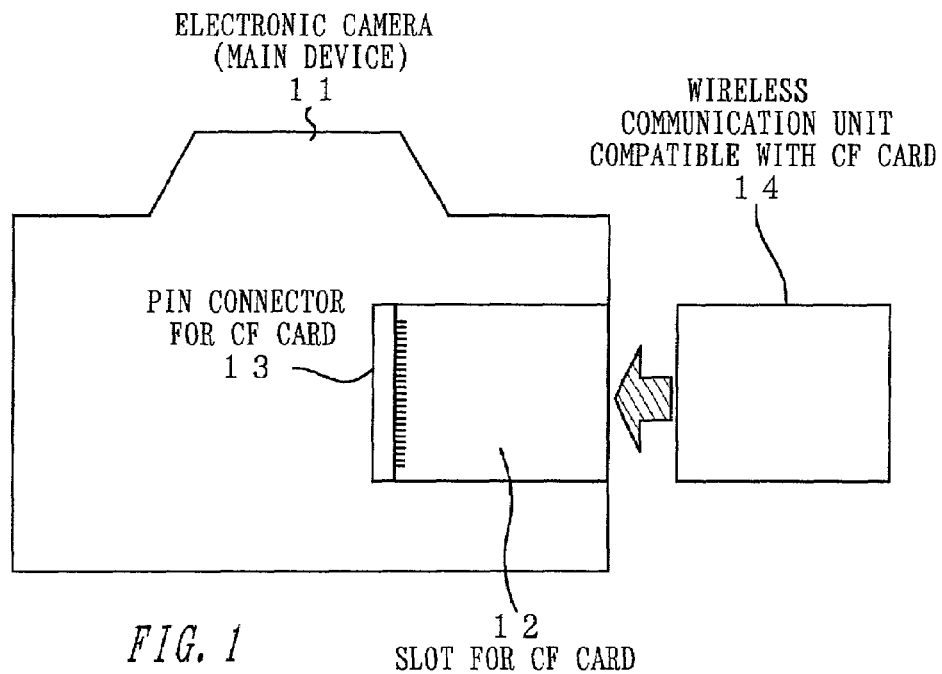
FIG. 1 is a diagram showing a system configuration.

FIG. 1 is a diagram showing a system configuration in this embodiment. In FIG. 1, a slot 12 for accommodating therein a Compact Flash (CF) card is provided in an electronic camera 11. A pin connector 13 for signally connecting the CF card is disposed in the slot 12. A wireless communication unit 14 is accommodated in the slot 12. An outer shape of the wireless communication unit 14 has compatibility with an outer shape of the CF card.

Figure 2:
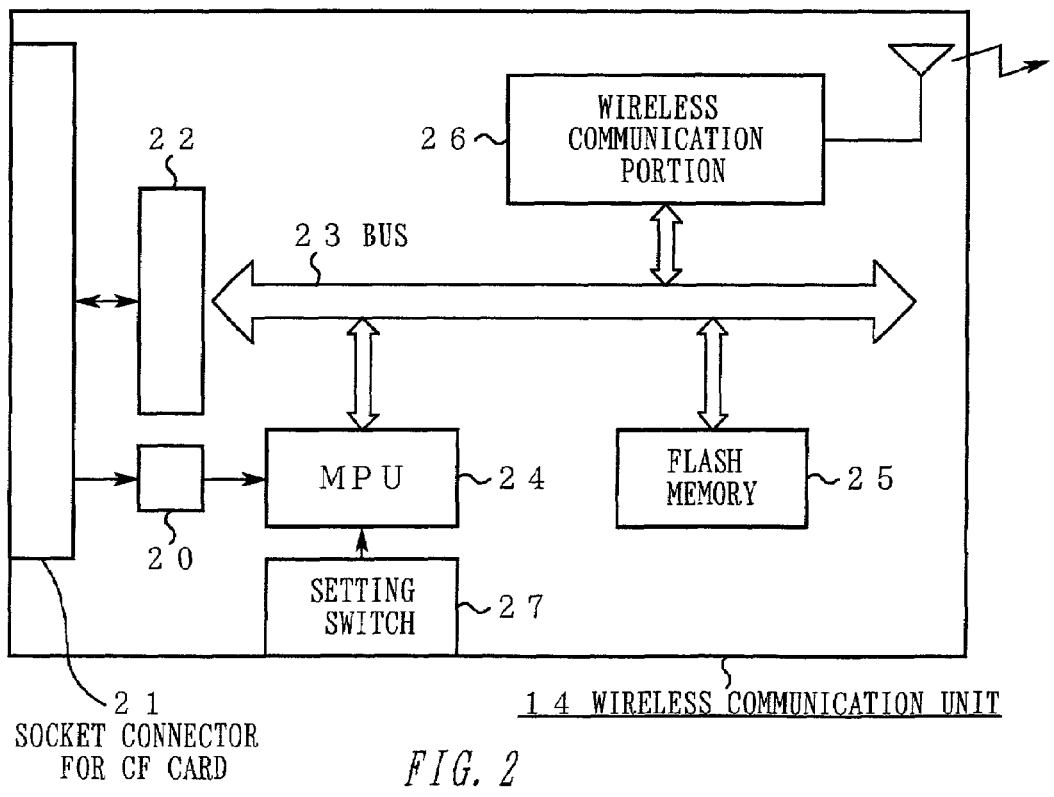
FIG. 2 is a block diagram showing an internal configuration of a wireless communication unit 14.

FIG. 2 is a block diagram showing an internal configuration of the wireless communication unit 14. In FIG. 2, a socket connector 21 similar to that of the CF card is provided in the wireless communication unit 14. The socket connector 21 is connected to the pin connector 13 of the electronic camera 11 by accommodating the wireless communication unit 14 in the electronic camera 11. Then, electric power is supplied from the electronic camera 11 to power lines (VCC, GND) of the socket connector 21.

Meanwhile, a signal line of the socket connector 21 is connected to a bus 23 through an interface circuit 22. To the bus 23, connected are: (1) an MPU 24 for controlling operations of the wireless communication unit 14; (2) a flash memory 25 for non-volatile recording; and (3) a wireless communication portion 26 for Bluetooth wireless communication. Moreover, to the MPU 24, signally connected are: (1) a setting switch 27 of the wireless communication unit 14; and (2) a power source state detection portion 20 for monitoring lowering of a power source voltage.

[Correspondence Between the First Embodiment and the Invention]

Here, description will be made for a correspondence between the present invention and the first embodiment. Note that the correspondence made here only shows one interpretation for reference and does not limit the present invention.

A main device according to claims corresponds to the electronic camera 11.

An interface portion according to claims corresponds to the socket connector 21 and the interface circuit 22.

A recording portion according to claims corresponds to the flash memory 25.

A wireless communication portion according to claims corresponds to the wireless communication portion 26.

A control portion according to claims corresponds to the MPU 24.

A power source state detection portion according to claims corresponds to the power source state detection portion 20.

A mode input portion according to claims corresponds to the setting switch 27.

[Description of the Operation of the First Embodiment]

Figure 3:
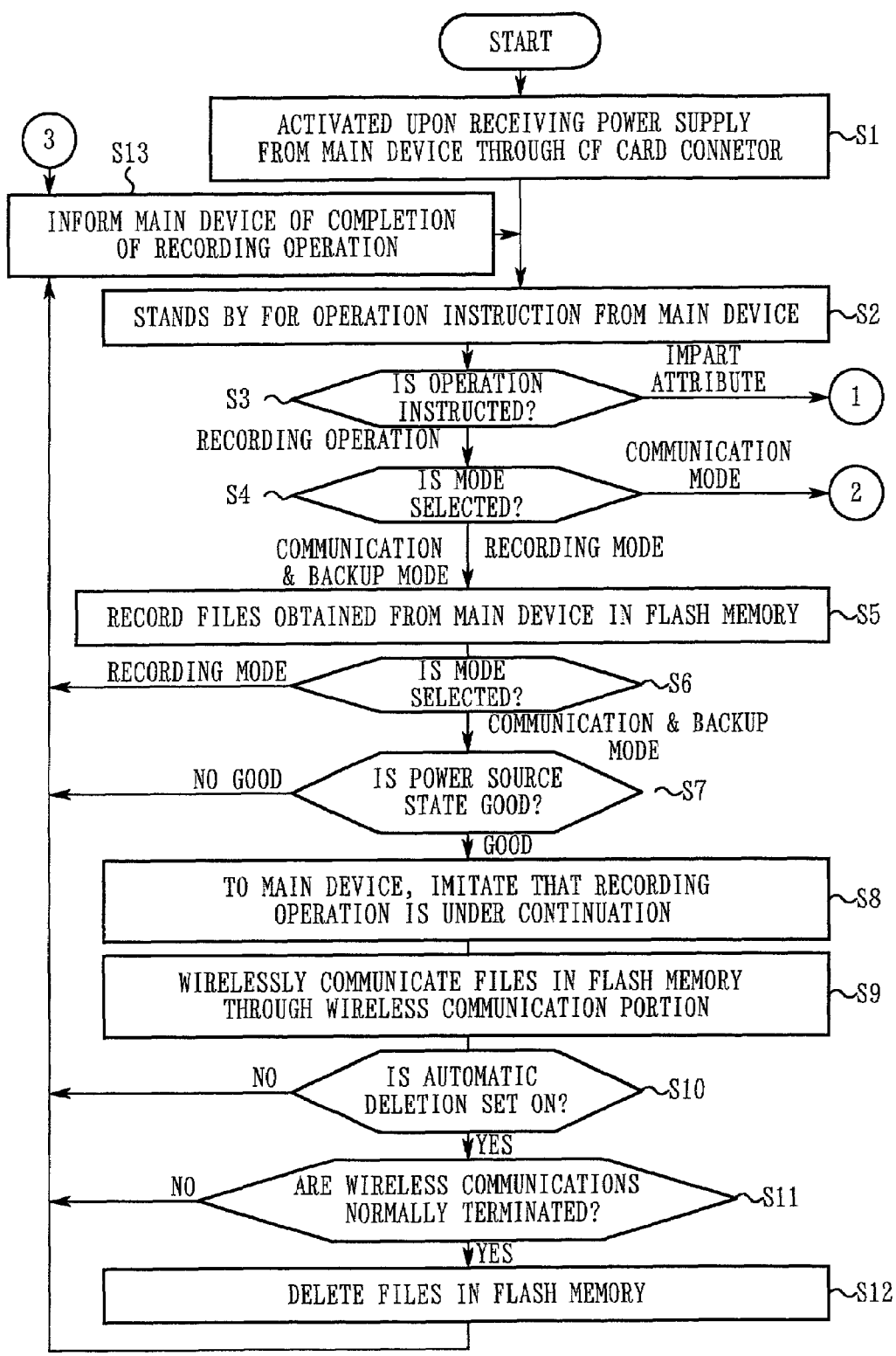
FIG. 3 is a flowchart (1/2) explaining operations of the wireless communication unit 14.
Figure 4:
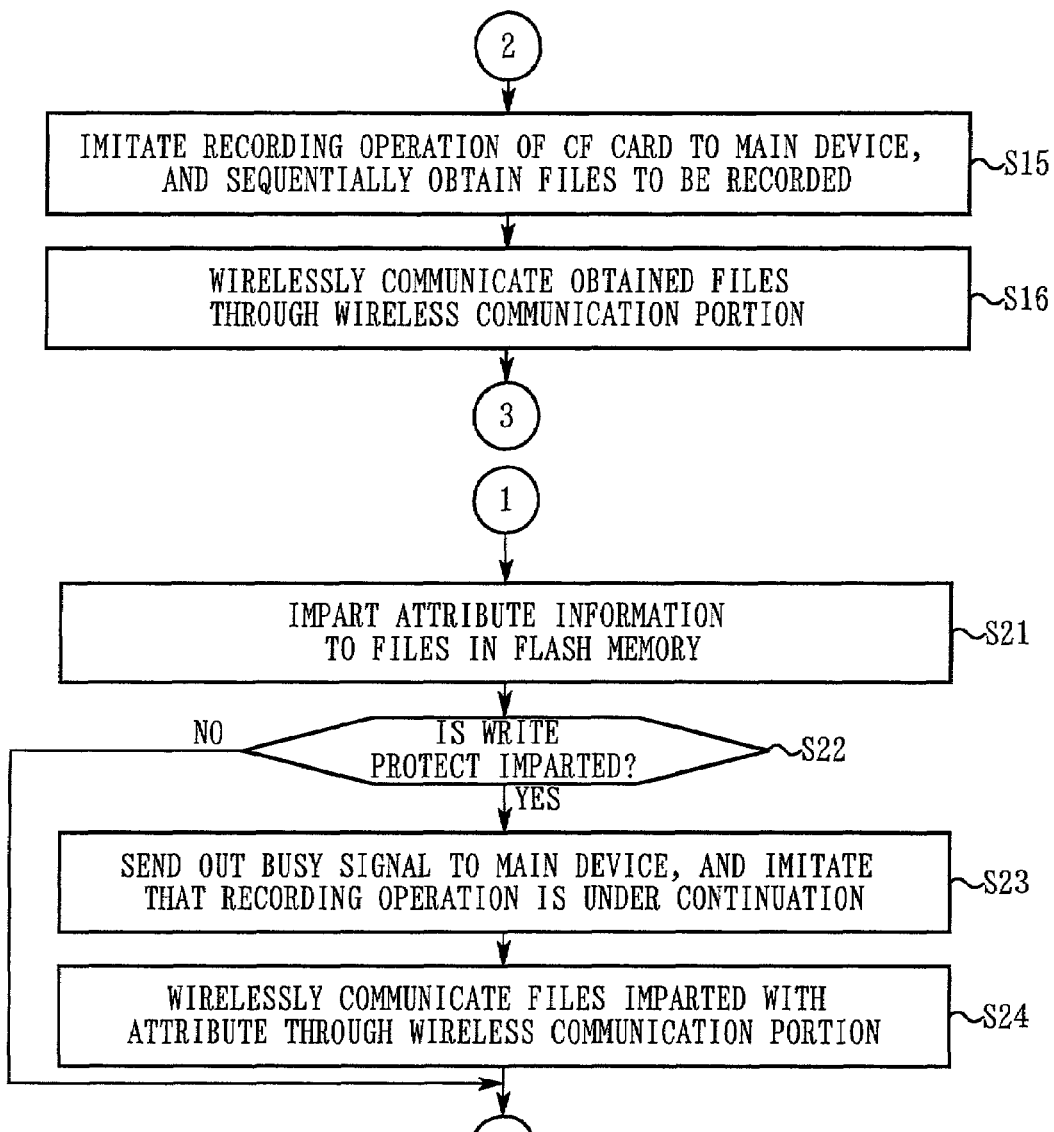
FIG. 4 is a flowchart (2/2) explaining the operations of the wireless communication unit 14.

FIGS. 3 and 4 are flowcharts explaining the operation of the first embodiment. Hereinafter, description will be made for the operation of the first embodiment following step numbers shown in FIGS. 3 and 4. Note that, in order to facilitate the understanding of the description, the "main device" shown in FIGS. 3 and 4 will be described while interpreting the same as the "electronic camera 11," which is the concrete example of the main device.

Step S1: When a main power source of the electronic camera 11 is turned on, power starts to be supplied through the power line of the socket connector 21 to the wireless communication unit 14. The MPU 24 is activated by this supplied power.

Step S2: The MPU 24 stands by for an operation instruction from the electronic camera 11.

Step S3: Upon receiving the operation instruction from the electronic camera 11, the MPU 24 judges the contents of the operation instruction. Here, when the contents are an operation instruction of imparting (or changing) attribute information to files in the flash memory 25, the operation of the MPU 24 proceeds to step S21. Alternatively, when the contents are an operation instruction of newly recording an image file newly photographed, the operation of the MPU 24 proceeds to step S4.

Step S4: The MPU 24 determines the state of the setting switch 27, and obtains an operation mode set by the user. Here, when the operation mode is set to a "communication mode," the operation of the MPU 24 proceeds to step S15. Alternatively, when the operation mode is set to any of a "communication & backup mode" and a "recording mode," the operation of the MPU 24 proceeds to step S5.

Step S5: Similarly to a regular CF card, the MPU 24 sequentially records files to be obtained from the electronic camera 11 in the flash memory 25.

Step S6: The MPU 24 again determines the operation mode. Here, when the "recording mode" is set as the operation mode, the MPU 24 omits subsequent communication operations and proceeds to step S13. Alternatively, when the "communication & backup mode" is set, the MPU 24 executes communication operations of step S7 and later.

Step S7: The MPU 24 receives a monitoring result of the state the power source is in from the power source state detection portion 20. Here, when it is judged that "the power source voltage is too low for the operation of the wireless communication," the MPU 24 gives up the communication operation and proceeds to step S13. Alternatively, when it is judged that "the power source voltage is good" in the power source state detection portion 20, the operation of the MPU 24 proceeds to step S8.

Step S8: Through the interface circuit 22 and the socket connector 21 to the electronic camera 11, the MPU 24 imitates that the recording operation is under continuation. Consequently, the electronic camera 11 continues to supply power to the wireless communication unit 14.

Step S9: The MPU 24 reads out the files recorded in step S5 from the flash memory 25, and gives the same to the wireless communication portion 26 one by one. The wireless communication portion 26 subjects data of the files given thereto to processing such as base band processing and spectrum diffusion, then sends out the data as radio waves to a predetermined destination. Note that the destination is preset through the setting switch 27 and the like.

Step S10: Based on the state of the setting switch 27, the MPU 24 judges whether or not automatic deletion is set on. If the automatic deletion is set off, the operation of the MPU 24 proceeds to step S13 while leaving the backed-up information in the flash memory 25. Alternatively, if the automatic deletion is set on, the operation of the MPU 24 proceeds to step S11.

Step S11: The MPU 24 judges whether or not the wireless communication in step S9 are normally terminated by for instance receiving a response from the destination through the wireless communication portion 26. Here, when the wireless communication is not normally terminated, the operation of the MPU 24 proceeds to step S13 while leaving the backed-up information in the flash memory 25 in preparation for another attempt of the wireless communication and the like. Alternatively, when the wireless communication is normally terminated, the operation of the MPU 24 proceeds to step S12. Note that, when the result of the wireless communication cannot be confirmed due to the communication standard, the MPU 24 determines whether or not the backed-up information in the flash memory 25 is to be automatically deleted from a point of view of securing a predetermined amount of free space in the flash memory 25.

Step S12: The MPU 24 automatically deletes the backed-up information created in step S5 from the flash memory 25. After such deletion operation, the operation of the MPU 24 proceeds to step S13.

Step S13: The MPU 24 informs the electronic camera 11 of completion of the recording operation. Thereafter, the operation of the MPU 24 returns to step S2 and prepares for the next operation.

Through the series of the operation (steps S5 to S13) above, operations of both the "recording mode" and the "communication & backup mode" are realized.

Subsequently, description will be made for the operation of step S15 and later, which branches out from the above-described step S4.

Step S15: When the wireless communication unit 14 is set to the "communication mode" in the above-described step S4, the MPU 24 imitates the recording operation of the CF card to the electronic camera 11 through the interface circuit 22 and the socket connector 21. Consequently, the electronic camera 11 sequentially transmits the files for recording to the wireless communication unit 14, assuming that it is a regular recording operation.

Step S16: The MPU 24 gives the data of the files obtained in step S15 to the wireless communication portion 26 one by one. The wireless communication portion 26 subjects the data to the base band processing and the spectrum diffusion, then sends out the data as radio waves to a predetermined destination. After completing the operation of such wireless communication, the operation of the MPU 24 proceeds to step S13.

Through the above-described series of operation (steps S15 and S16), the operation of the "communication mode" is realized.

Next, description will be made for the operation of step S21 and later, which branches out from the above-described step S3.

Step S21: When the electronic camera 11 instructs the operation of imparting attributes to the files in the above-described step S3, the MPU 24 imparts the attribute information to the files in the flash memory 25 following the above operation instruction.

Step S22: Next, the MPU 24 judges whether or not the attribute information imparted to the files is attribute information indicating that the files have write protect (for example, read-only). When the attribute information is not the write protect, the MPU 24 skips the processing that follows and proceeds to step S13. Alternatively, when the attribute information is the write protect, the operation of the MPU 24 proceeds to step S23.

Step S23: The MPU 24 imitates to the electronic camera 11 that the recording operation (for example, the operation of imparting the attribute information) is under continuation.

Step S24: The MPU 24 selects the file imparted with the attribute information in step S21 from the flash memory 25 and sequentially gives the data of the selected file to the wireless communication portion 26. The wireless communication portion 26 subjects the data to the band base processing and the spectrum diffusion and then sends out the data as radio waves to the predetermined destination. After completing such wireless communication, the operation of the MPU 24 proceeds to step S13.

Through the above series of operation (steps S21 to S24), it is made possible to communicate wirelessly the files recorded in the flash memory 25 another time later.

[Advantage of the First Embodiment and So On]

In the above-described first embodiment, the backup is generated in the wireless communication unit 14 while executing the wireless communication. Therefore, the user does not have to undergo intricate trouble of sorting and storing the information in preparation of a wireless communication failure, and thus it is made possible to readily perform wireless communication.

Moreover, in the first embodiment, the recorded data is communicated wirelessly while the recording operation of the CF card is being imitated. Hence, if the main device includes the slot for the CF card, the wireless communication unit 14 can be connected thereto. In this case, the wireless communication unit 14 is regarded only as the CF card by the main device, and it is made possible to communicate wirelessly by execution of the regular recording operation. Accordingly, the communication driver program or the communication software is not required to be additionally prepared in the main device.

Furthermore, in the first embodiment, determination is made as to whether or not the wireless communication is executed in response to the quality judgment of the state the power source is in. Accordingly, it is made possible to realize wireless communication with excellent reliability.

Moreover, in the first embodiment, it is made possible to use the wireless communication unit 14 as an ordinary CF card by selecting the "recording mode." Accordingly, in an emergent situation where memory cards are short, the recording portion of the wireless communication unit 14 can be effectively utilized.

Furthermore, in the first embodiment, it is made possible to execute wireless communication without creating backups by selecting the "communication mode" even in a situation where there is not enough backup capacity in the flash memory 25.

Moreover, in the first embodiment, after normal termination of the wireless communication, the backed-up information can be automatically deleted from the flash memory 25. In this case, it is made possible to avoid a situation such as a shortage of the capacity of the flash memory 25 caused by remaining backed-up information.

Furthermore, in the first embodiment, it is made possible to selectively communicate the information imparted with the write protect wirelessly.

Moreover, in the first embodiment, since continuation of the recording operation is imitated to the main device during wireless communication, there is no possibility that the power supply from the main device stops during the wireless communication.

Furthermore, in the first embodiment, the outer shape of the wireless communication unit 14 has compatibility with the outer shape of the CF card. Accordingly, it is made possible to fit the wireless communication unit 14 instead of the CF card even to a main device that assumes no use of the wireless communication unit 14.

Next, description will be made for another embodiment.

Second Embodiment

The second embodiment is an embodiment corresponding to the invention according to claims 1 to 10 and 12.

Figure 5:
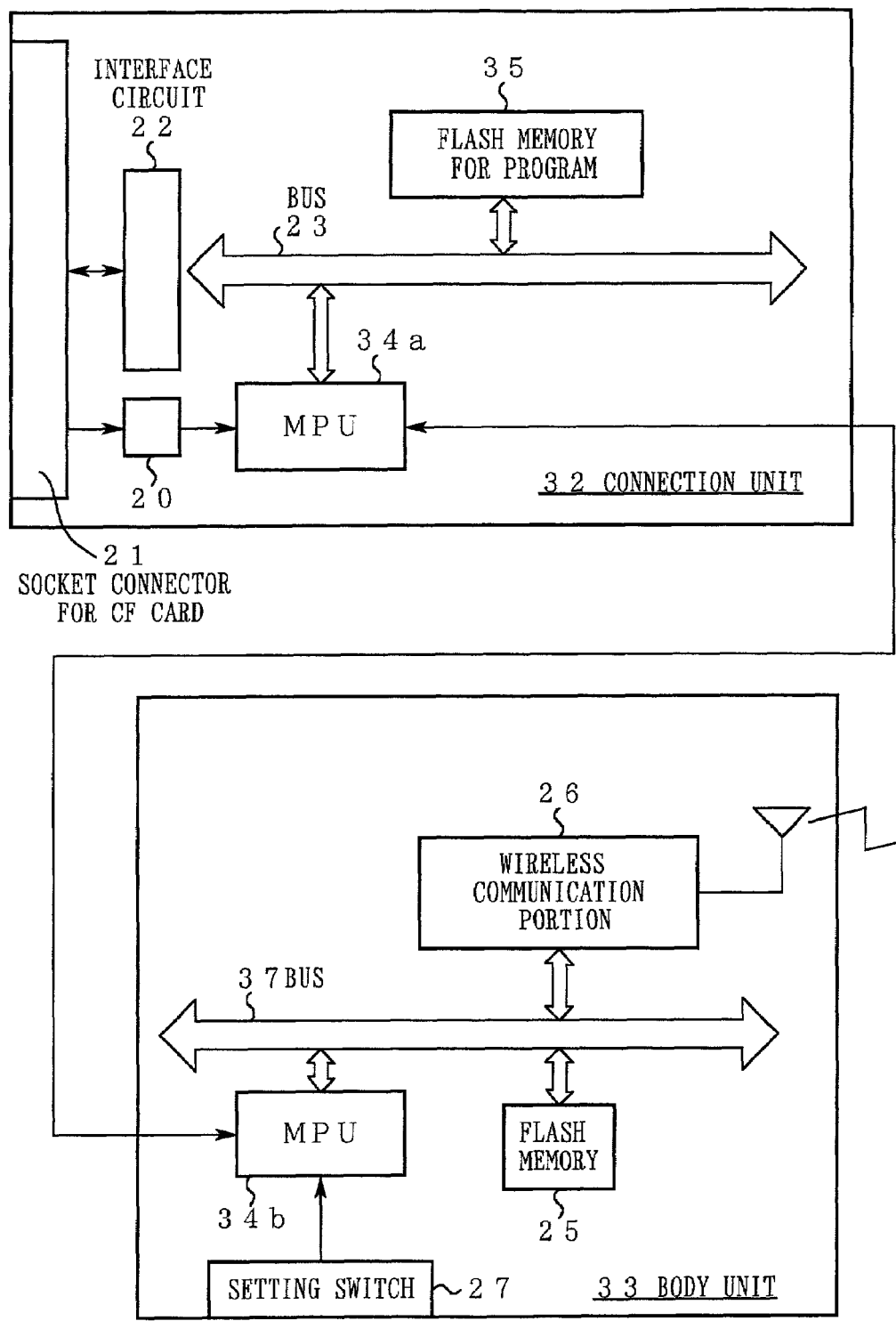
FIG. 5 is a diagram showing a configuration of a wireless communication unit 31.

FIG. 5 is a diagram showing a configuration of a wireless communication unit 31 in the second embodiment. Note that, in FIG. 5, constituent components common to those in the first embodiment are imparted with identical reference numbers to those of the first embodiment, and repeated description will be omitted here.

As shown in FIG. 5, the wireless communication unit 31 is constituted of a connection unit 32 with the same size as the CF card and a body unit 33 signally connected to the connection unit 32.

In the connection unit 32, at least a socket connector 21 for a CF card is provided. Furthermore, it is preferable that an interface circuit 22, a bus 23, a flash memory 35 for a program and an MPU 34a be provided in the connection unit 32. The MPU 34a has a function of imitating the recording operation to the main device through the socket connector 21 and a function of subjecting information obtained through the socket connector 21 to serial conversion, thus transmitting the information to the body unit 33.

Meanwhile, at least a wireless communication portion 26 is provided in the body unit 33. Furthermore, it is preferable that an MPU 34b, a flash memory 25 and a bus 37 be provided in the body unit 33. The MPU 34b has a function of recording (for example, creating a backup of) information transmitted from the connection unit 32 into the flash memory 25 and a function of communicating wirelessly the information through the wireless communication portion 26.

According to such configuration of the wireless communication unit 31, miniaturization of the connection unit 32 becomes easy. Accordingly, it is made possible to readily realize a wireless communication unit 31 that can be used instead of a small recording medium such as a CF card.

Next, description will be made for still another embodiment.

Third Embodiment

The third embodiment is an embodiment corresponding to the invention according to claims 1 to 10, 12 and 13.

Figure 6:
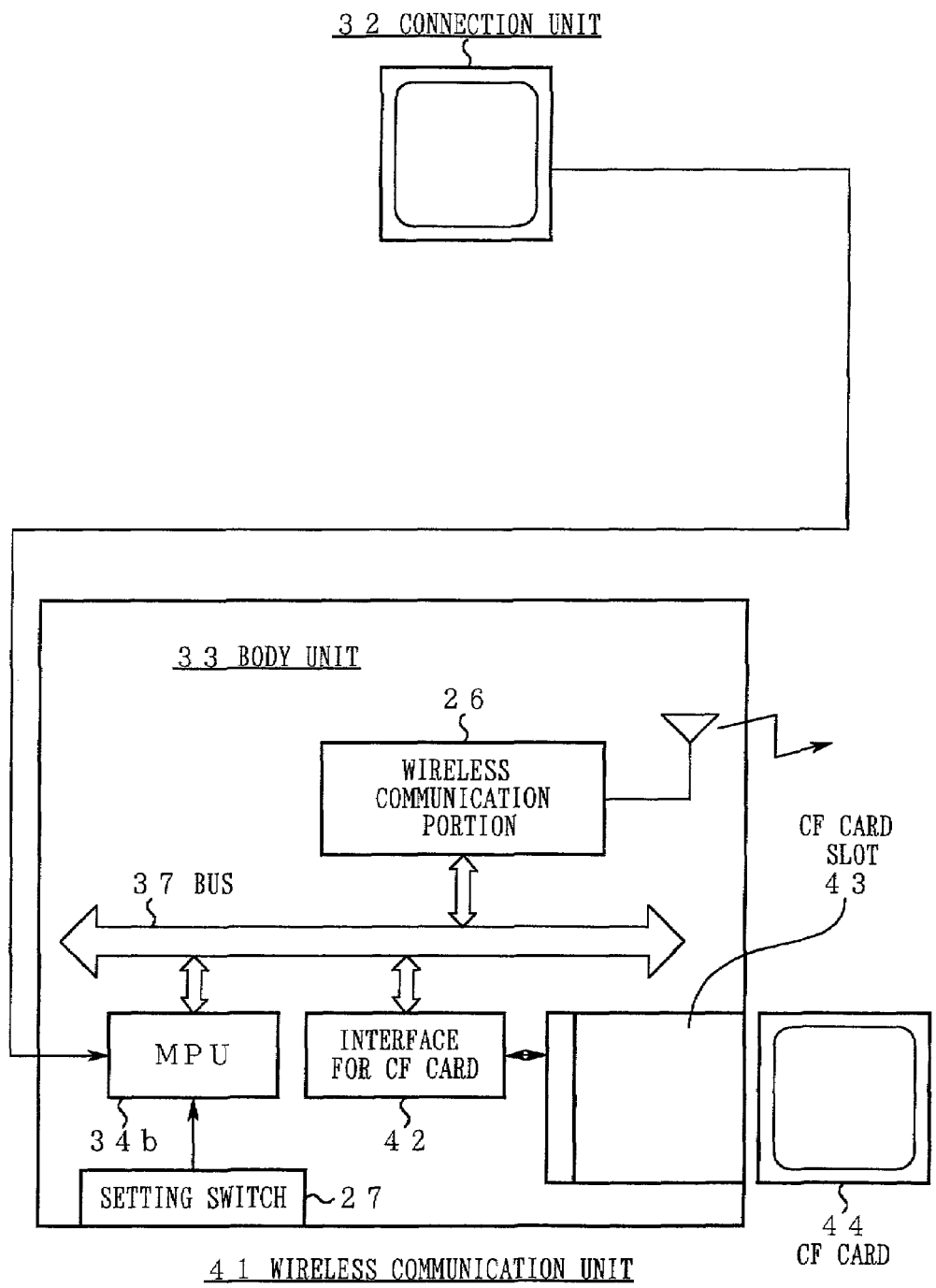
FIG. 6 is a diagram showing a configuration of a wireless communication unit 41.

FIG. 6 is a diagram showing a configuration of a wireless communication unit 41 in the third embodiment. Note that, in FIG. 6, constituent components common to those in the second embodiment are imparted with identical reference numbers to those of the second embodiment, and repeated description will be omitted here.

A constitutional characteristic of the wireless communication unit 41 is that, instead of the flash memory 25 in the second embodiment, an interface 42 for a CF card and a CF card slot 43 (corresponding to an extension connector of claim 13) are provided therein.

A CF card 44 is appropriately fitted in substitution into the CF card slot 43. The MPU 34b records (for example, creates a backup of) the information transmitted from the connection unit 32 in the CF card 44.

According to the configuration of the wireless communication unit 41 as described above, it is made possible to increase the backup capacity substantially without limit by appropriately exchanging CF cards 44 fitted to the CF card slot 43.

Supplementation of the Embodiments

Note that, in the above-described embodiments, the electronic camera 11 has been exemplified as the main device in the description. However, the present invention is not limited to this. Generally, any main device may be employed as long as the main device has a connector dedicated to a recording-medium.

Moreover, in the above-described embodiments, the CF card slot has been exemplified as the connector dedicated to a recording-medium in the description. However, the present invention is not limited to this. Any connector dedicated to a recording-medium may be employed as long as the connector is a slot for a memory stick, a slot for smart media and the like.

Furthermore, in the above-described embodiments, description has been made for the wireless communication portion 26 performing the Bluetooth wireless communication. However, the present invention is not limited to this. Any wireless communication portion may be employed as long as the wireless communication portion performs the wireless communication such as wireless communication by cellular phone.

Moreover, in the above-described embodiments, the flash memory 25 has been exemplified as a recording portion performing the non-volatile recording in the description. However, the present invention is not limited to this. Any recording portion may be employed as long as the recording portion is a non-volatile recording-medium such as a magnetoresistive random access memory (MRAM).

Note that, in the above-described embodiments, description has been made for the operation when the write protect attribute is later imparted to the files in the flash memory 25. However, the present invention is not limited to this. For example, the MPU 24 may selectively execute at least one of the "communication mode," the "recording mode" and the "communication & backup mode" in accordance with the imparted file attribute when new recording is instructed. In such operation, attribute information during new recording is controlled by the main device, thus making it possible to control the operation mode of the wireless communication unit.

Moreover, in the above-described embodiments, in the description, the write protect has been exemplified as the attribute information selectively executing the wireless communication. However, the present invention is not limited to this. In general, any attribute information may be employed. For example, attribute information indicating whether or not the file is a hidden file, attribute information indicating whether or not the file is an archive, and attribute information indicating whether or not the file is a system file may be used.

Moreover, for example, attribute information regarding a folder (directory) may trigger selective execution of the wireless communication. In this case, recording (including moving) the files into a certain folder in the main device makes selective wireless communication of the files possible. Furthermore, in this case, it is preferable that the control portion of the wireless communication unit wirelessly communicates the files to a destination determined in the certain folder (the folder name corresponds to an IP address, a URL or a telephone number, for example). With such a constitution, the folder recording the files is designated or selected in the main device, thus making it possible to readily designate the destination.

The invention is not limited to the above embodiments and various modifications may be made without departing from the spirit and scope of the invention. Any improvement may be made in part or all of the components.

What is claimed is:

1. A wireless communication unit, comprising:
   an interface portion signally connectable to a main device, the interface portion including a connector portion having a shape that mimics a shape of a removable memory-medium-device, the connector portion being receivable by and connectable to a memory-medium-device-receiving-portion of the main device;
   a recording portion performing non-volatile recording;
   a wireless communication portion performing wireless communication; and
   a control portion transmitting information through the wireless communication portion to an external destination and generating a backup of the information in the recording portion, the information being inputted from the main device to the control portion through the interface portion, wherein the control portion automatically deletes the backup from the recording portion after transmission of the information in the wireless communication portion is normally terminated, when the control portion generates the backup of the information in the recording portion,
   wherein the wireless communication unit is a stand-alone unit.

2. The wireless communication unit according to claim 1, wherein the connector portion is shaped to mimic a shape of a memory card, the connector portion being receivable by a slot in the main device.

3. The wireless communication unit according to claim 1, wherein the connector portion includes a power line by which power is supplied to the wireless communication unit from the main device.

4. The wireless communication unit according to claim 1, wherein the control portion selects the information that is to be transmitted based on predetermined attribute information that is associated with the information and that indicates characteristics of the information, and transmits the selected information through the wireless communication portion to the external destination.

5. The wireless communication unit according to claim 4, wherein the predetermined attribute information is information indicating that the information to be transmitted has a write-protect attribute.

6. The wireless communication unit according to claim 4, wherein the predetermined attribute information is information regarding a folder in which the information to be transmitted is stored.

7. The wireless communication unit according to claim 6, wherein the control portion transmits the selected information to the external destination specified by the folder, through the wireless communication portion.

8. The wireless communication unit according to claim 4, wherein the predetermined attribute information is information specifying the external destination to which the information is to be transmitted.

9. The wireless communication unit according to claim 8, wherein the predetermined attribute information is information regarding a folder in which the information to be transmitted to the specified external destination is stored.

10. The wireless communication unit according to claim 4, further comprising an attribute information imparting portion that associates the predetermined attribute information to a specified information to be transmitted.

11. The wireless communication unit according to claim 10, wherein the predetermined attribute information, that the attribute information imparting portion associates to the information to be transmitted, is information indicating that the information to be transmitted has a write-protect attribute.

12. The wireless communication unit according to claim 10, wherein the predetermined attribute information, that the attribute information imparting portion associates to the information to be transmitted, is information that specifies the external destination to which the information is to be transmitted.

13. The wireless communication unit according to claim 12, wherein the predetermined attribute information is information regarding a folder in which the information to be transmitted to the specified external destination is stored.

14. A wireless communication unit, comprising:
   an interface portion signally connectable to a main device, the interface portion including a connector portion having a shape and terminal layout that mimics a shape and terminal layout of a removable memory device, the connector portion being receivable by and connectable to a memory-device-receiving-slot and terminal of the main device;

a non-volatile memory;
a wireless communication portion performing wireless communication; and
a control portion transmitting information through the wireless communication portion to an external destination and generating a backup of the information in the non-volatile memory, the information being inputted from the main device to the control portion through the interface portion, wherein the control portion automatically deletes the backup from the non-volatile memory after transmission of the information in the wireless communication portion is normally terminated, when the control portion generates the backup of the information in the non-volatile memory.

15. The wireless communication unit according to claim 14, wherein the connector portion includes a power line by which power is supplied to the wireless communication unit from the main device.

* * * * *